United States Patent [19]

Richards et al.

[11] Patent Number: 4,833,405
[45] Date of Patent: May 23, 1989

[54] SHAFT FAILURE MONITORING SYSTEM USING ANGLED ROTATING TEETH AND PHASE DETECTION

[75] Inventors: Paul N. Richards, Knebworth; Michael C. Douglas, Wormley; David C. Snowden, Cockfosters; Kenneth W. Proctor, Hornchurch; Malcolm P. Perks, Abbots Landing, all of England

[73] Assignee: Schlumberger Electronics (UK) Limited, Farnborough, United Kingdom

[21] Appl. No.: 172,015

[22] Filed: Mar. 23, 1988

[30] Foreign Application Priority Data

Mar. 24, 1987 [GB] United Kingdom ............... 8706905

[51] Int. Cl.$^4$ .................. G01B 7/14; G01R 33/00
[52] U.S. Cl. .................. 324/208; 324/262; 324/233; 340/870.31
[58] Field of Search ............ 324/207, 208, 61 R, 324/233, 174, 262; 336/45; 235/449, 493; 340/347 P, 870.31, 870.37

[56] References Cited

U.S. PATENT DOCUMENTS

| 3,190,125 | 6/1965 | Holz | 340/870.37 X |
| 3,641,535 | 2/1972 | Knopf | 340/870.31 |
| 3,863,235 | 1/1975 | McKee et al. | 340/870.31 |
| 4,518,917 | 5/1985 | Oates et al. | 324/208 X |
| 4,746,859 | 5/1988 | Malik | 324/208 |
| 4,764,767 | 8/1988 | Ichikawa et al. | 340/870.31 |

FOREIGN PATENT DOCUMENTS

| 0111719 | 7/1983 | Japan | 324/207 |
| 1303994 | 1/1973 | United Kingdom . | |
| 2181246 | 4/1987 | United Kingdom . | |

Primary Examiner—Reinhard J. Eisenzopf
Assistant Examiner—Jack B. Harvey
Attorney, Agent, or Firm—Sanford J. Asman

[57] ABSTRACT

A shaft monitoring system for sensing axial movement of a shaft, especially in a gas turbine engine, comprises a toothed wheel attached to and rotatable with the shaft, and a pair of inductive sensors disposed radially of the toothed wheel for sensing the passage of the teeth as the shaft rotates. In one embodiment, the toothed wheel has two axially-spaced sets of teeth, one set straight cut and the other set diagonal cut, so that the phase difference between the respective outputs of the sensors varies with axial movement of the shaft. In another embodiment, the sensors are positioned at opposite axial ends of the toothed wheel, so that axial movement of the shaft causes one sensor output to increase in amplitude while the other decreases.

8 Claims, 4 Drawing Sheets

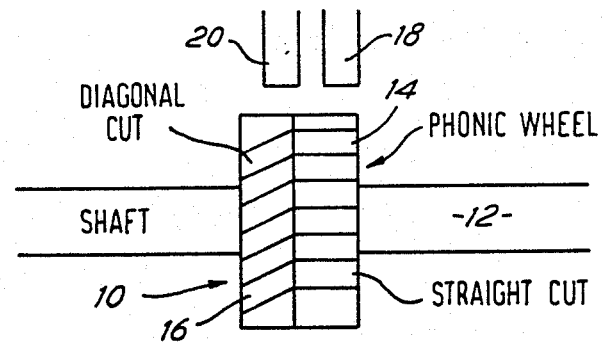
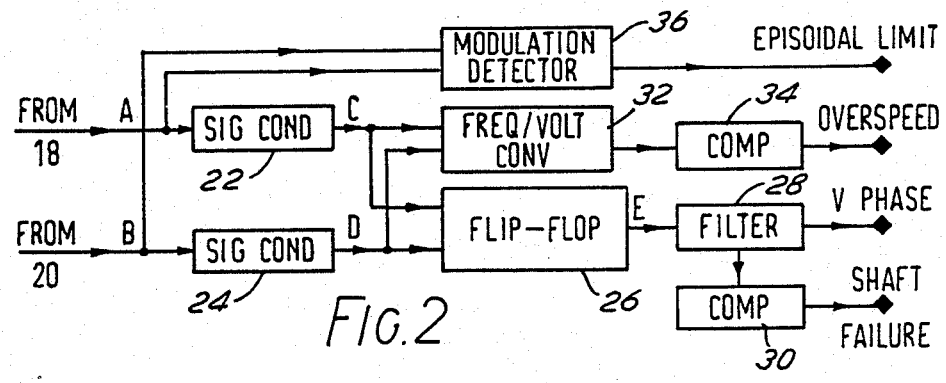
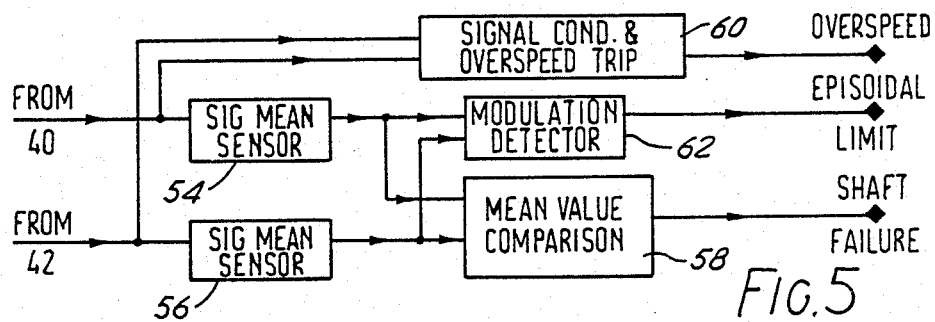
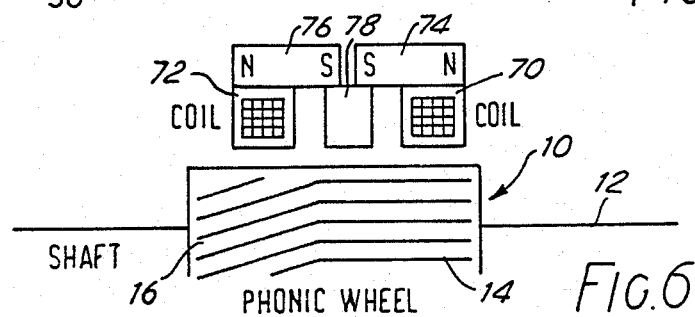

SHAFT FAILURE MONITORING SYSTEM USING ANGLED ROTATING TEETH AND PHASE DETECTION

This invention relates to shaft monitoring systems, and is more particularly but not exclusively concerned with shaft monitoring systems for use in gas turbine engines.

Imminent or actual failure of a shaft in a gas turbine engine is sometimes accompanied by axial movement of the shaft. It has previously been proposed to detect this axial movement by arranging that it causes a projecting member rotating with the shaft to move into contact with, and thus break, a fixed conductor disposed axially adjacent to the radial plane in which the projecting member normally rotates. However, this proposal suffers from the disadvantages that it provides only an on/off type of output signal, rather than a progressively changing one, and that the conductor occasionally smears instead of breaking, and so remains conducting. It is an object of the present invention in the first two of its aspects to provide a shaft monitoring system in which these disadvantages are eliminated.

According to the first aspect of the invention, there is provided a shaft monitoring system comprising:

first and second toothed members coaxially secured to the shaft for rotation therewith, said members being axially adjacent and each having at least one tooth which extends generally axially of the shaft at an angle to the axis of the shaft different from that of the tooth or teeth of the other member;

first and second sensors mounted adjacent said first and second toothed members respectively so as to produce respective alternating signals representative of the passage of the respective teeth therepast during rotation of the shaft, the disposition of the sensors with respect to their respective toothed members being such that axial movement of the shaft causes a change in phase between said alternating signals; and a circuit for producing an output signal representative of the phase difference between said alternating signals, and therefore representative of the axial position of the shaft.

In a preferred embodiment of this first aspect of the invention, both toothed members have a plurality of equiangularly spaced apart teeth, with the same number of teeth on both members.

Advantageously, the teeth on one of the toothed members extend parallel to the axis of the shaft, while those on the other toothed member are inclined to the axis of the shaft.

Conveniently, the toothed members are integral with or abut each other.

According to a second aspect of the invention, there is provided a shaft monitoring system comprising:

a toothed member coaxially secured to the shaft, said member having at least one tooth extending generally axially of the shaft;

a first sensor mounted adjacent one axial end of said tooth and arranged to produce an alternating signal representative of the passage of the tooth therepast during rotation of the shaft, the disposition of the sensor with respect to the toothed member being such that axial movement of the shaft causes the amplitude of said alternating signal to change;

a second sensor mounted adjacent the other axial end of said tooth so as to produce an alternating signal representative of the passage of the tooth therepast during rotation of the shaft, the disposition of said second sensor with respect to the toothed member being such that axial movement of the shaft causes the amplitude of the alternating signal produced by the second sensor to change in a sense opposite to the change caused by said movement to the alternating signal produced by the first sensor; and a circuit responsive to said alternating signals to produce an output signal representative of the axial position of the shaft.

Preferably, the toothed member has a plurality of equiangularly spaced apart teeth extending generally parallel to the axis of the shaft.

In both aspects of the invention, the teeth are preferably made from or include a magnetic material, and the or each sensor is an inductive sensor.

An important requirement for a shaft monitoring system, particularly a system for use in a gas turbine engine for an aircraft, is that it should have extremely high integrity. We believe that one way of achieving this is to ensure that the satisfactory operation of the system is substantially independent of the satisfactory operation or other measurement, control or like systems of the aircraft. In preferred embodiments of both aspects of the invention, therefore, the system further comprises a power supply circuit for deriving a DC power supply for said system from at least one of said alternating signals.

The system of both aspects of the invention preferably also includes an overspeed circuit for deriving from at least one of the alternating signals a signal indicating that the rotational speed of the shaft has exceeded a predetermined speed, and may advantageously further include a circuit for deriving from at least one of the alternating signals an output signal indicative of epicyclic movement of said shaft.

The invention will now be described, by way of example only, with reference to the accompanying drawings, of which:

FIG. 1 is a schematic diagram of part of a first embodiment of a shaft monitoring system in accordance with the present invention;

FIG. 2 is a schematic diagram of the remainder of the system containing the part of FIG. 1;

Figure 7:
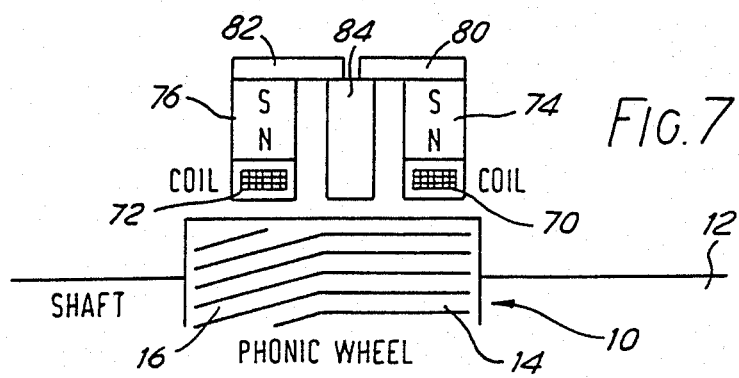
Figure 4:
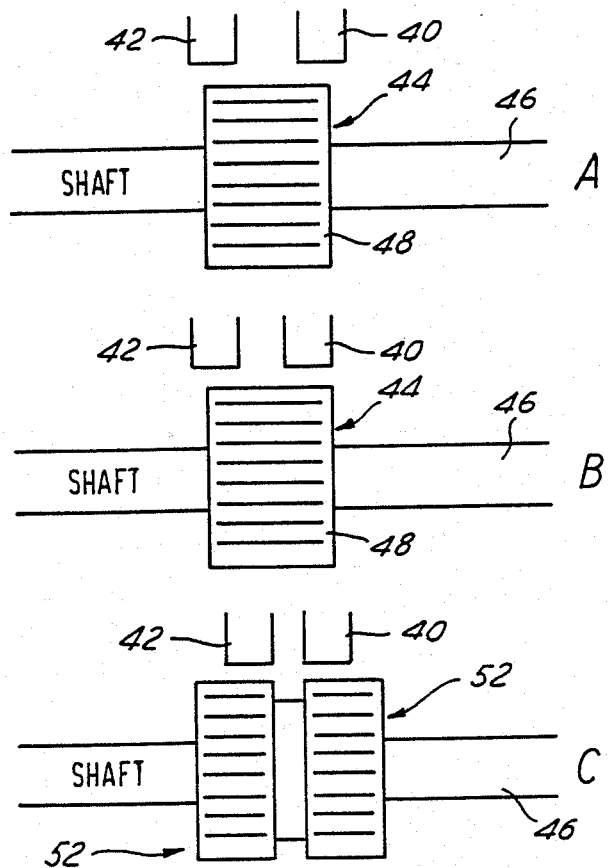
Figure 8:
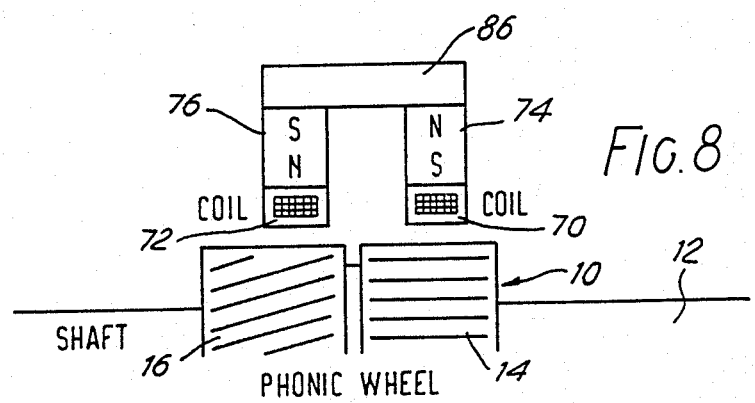
Figure 9:
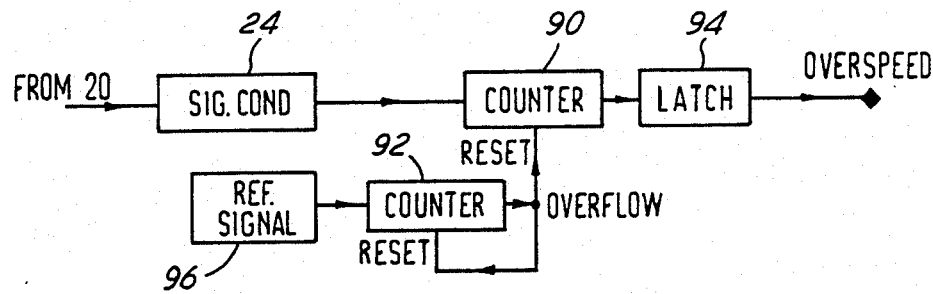
Figure 10:
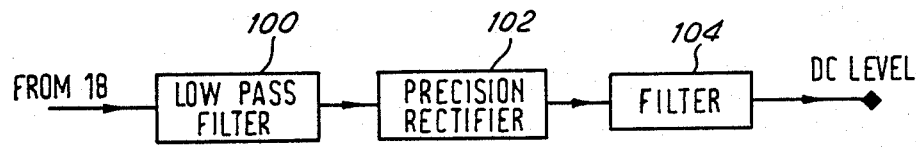
Figure 11:
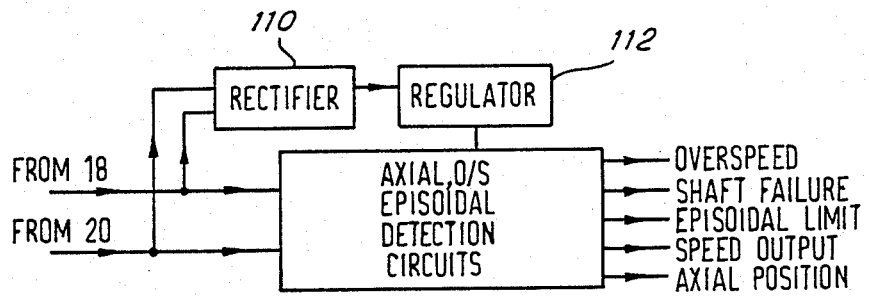

FIG. 4, parts A and B, shows in schematic form part of a second embodiment of a shaft monitoring system in accordance with the present invention, while FIG. 4, part C, shows an alternative arrangement of the part of FIGS. 4A and 4B;

FIG. 5 is a schematic diagram of the remainder of the system containing either the part of FIGS. 4A and 4B or the part of FIG. 4C;

FIGS. 6 to 8 show alternative forms of magnetic sensor for use in the system of FIGS. 1 and 2;

FIG. 9 shows two alternative versions of an overspeed circuit forming part of the system of FIGS. 1 and 2;

FIG. 10 is a simple block diagram of an epicyclic motion detection circuit forming part of the system of FIGS. 1 and 2; and FIG. 11 shows in simplified block form the system of FIGS. 1 and 2 together with its power supply.

The shaft monitoring systems of the drawings are all intended for incorporation in aircraft gas turbine engines, and are all based on toothed wheels or discs, sometimes known as "phonic wheels", which are secured to or formed integrally with the shaft to be monitored so as to be coaxial with the shaft. The systems all involve measurement of both rotational speed and axial movement of the shaft by magnetic detection of the teeth of such a phonic wheel by an inductive speed-type probe. This has several advantages:

1. It is possible to detect movement of the shaft in a linear manner, whereas the methods of the prior art had an absolute limit type of detection (ie they detected nothing until an absolute limit had been reached, and so gave out only a zero or one type indication). With a magnetic detection method it is possible if desired to produce a linear output related to the axial position of the shaft.

2. The magnetic detection method allows smaller movements of the shaft to be detected and is a non-destructive method of axial displacement measurement. It is possible by using this type of measurement to analyse axial movement to predict shaft failure.

3. The magnetic probes used replace the overspeed on the power turbine shaft and act as an overspeed and shaft failure detection system.

4. The system can be self-powered, that is independent of aircraft supply, by being powered by the speed-type probe it uses. Thus it is possible to create a self-contained unit/power system which gives an analogue and/or absolute limit type of axial movement indication as well as an overspeed function which is independent of any other engine control system that may be associated with the engine.

Two types of axial measurement using magnetics are described. These are:

1. Phase-shift measurement between two probe outputs from a straight/diagonal cut phonic wheel.

2. Sine wave average voltage comparison between the respective outputs of two probes arranged at opposite axial ends of the teeth of a straight cut phonic wheel.

The phase shift method of measurement produces a more accurate measure of the axial movement but involves a more complex phonic wheel structure. The voltage comparison method can possibly use existing phonic wheels, but requires a more complex probe structure, is not as accurate, and cannot measure over the same range.

FIG. 1 shows the probe and phonic wheel arrangement used in this proposed measurement technique. Thus the phonic wheel is indicated at 10, and is shown secured to and rotatable with a shaft 12 whose axial movement is to be monitored. The phonic wheel 10 has a first set of teeth 14 which are straight cut, ie extend parallel to the axis of the wheel, and a second set of teeth 16 which are disposed at one axial end of the teeth 14 and are diagonal cut, ie extend parallel to each other but in a direction inclined to the axis of the wheel. Two axially-spaced inductive probes 18,20 are positioned to sense the passage of the teeth 14 and the teeth 16 respectively.

In operation, the signals induced in each of the probes 18,20 are compared in phase, and a voltage output proportional to their phase difference is produced. Probe 18 (pick-up off the straight cut teeth 14) is used to produce a reference signal, which has a constant phase relative to shaft revolutions. Probe 20 (pick-up off the diagonal cut teeth 16) produces the phase signal, the phase of which relative to the shaft revolutions (and therefore to the probe 18 signal) varies with the axial position of the shaft 12. Thus it is possible with such a set-up to measure the axial displacement of the shaft 12 from a given starting position. The initial phase measured will be representative of the initial axial position of the shaft 12, any variation from this initial phase measurement will represent an axial movement of the shaft. Calibration of the initial phase offset can be performed on engine by means of a signature type input of the kind described in our United Kingdom Pat. Nos. 2 082 859 and 2 132 802. The system will then provide an accurate output of shaft position (relative to the starting point), and may thus provide an indication of onsetting shaft failure. An overspeed trip facility can also be provided from the reference probe, and a method of detection of episoidal (epicyclic) shaft revolution (e.g. due to loss of a blade) is possible within the same system by measurement of modulation transients, as will hereinafter become apparent.

The circuitry needed for axial measurement of this type is relatively simple, as can be seen in FIG. 2. Thus the input signals from the probes 18,20 go through conditioning circuits 22,24 respectively, which convert each signal into a square wave. Then these two square waves are used to set and reset a flip-flop 26, which therefore produces an output signal whose mark/space ratio is proportional to the phase difference between the signals from the probes 18,20. Passing this output signal through a filter 28 provides a voltage proportional to phase, which is then applied to a comparator circuit 30 to detect excess shaft movement. Overspeed trip is performed by a simple precision frequency-to-voltage converter 32 and maximum comparator 34. The final function (detecting episoidal transients) is realised by a detector 36, which monitors the modulation of the mean rectified probe waveform and produces an output signal if a predetermined maximum allowable modulation for the shaft is exceeded.

Figure 3:
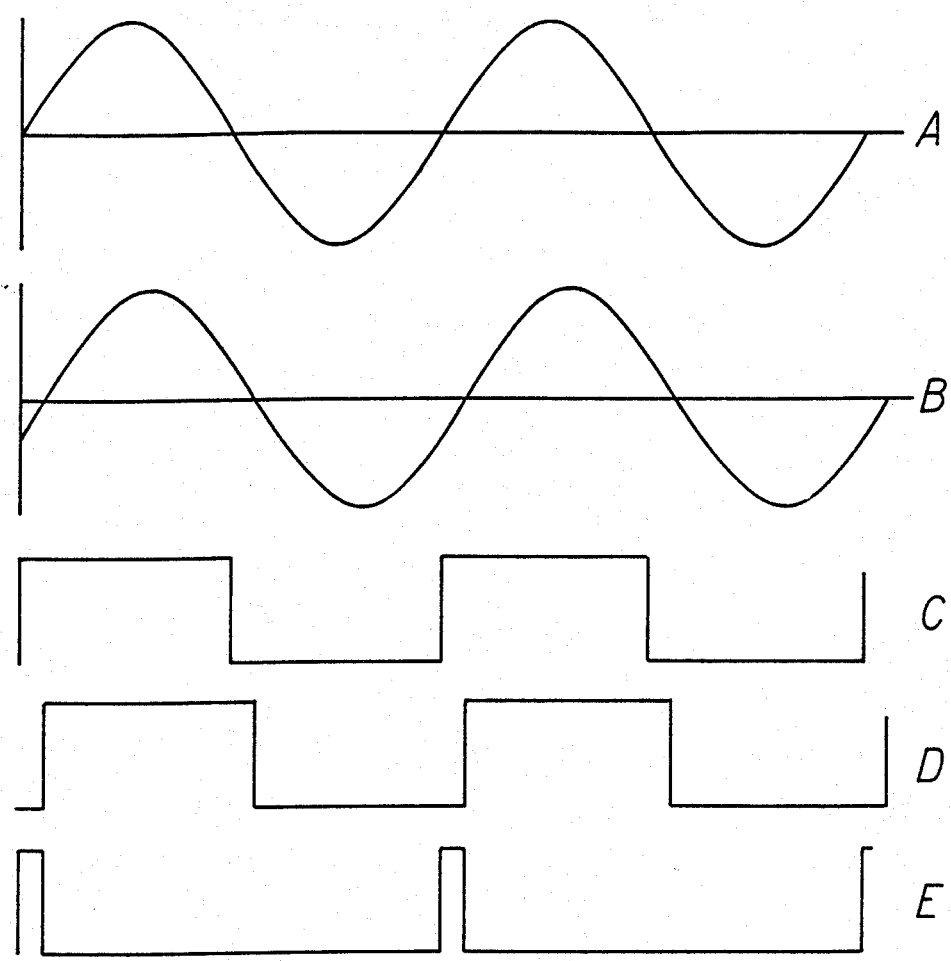
FIG. 3 shows electrical waveforms appearing at various points in the system of FIG. 2.

FIG. 3 shows the resulting waveforms at various points, indicated at A to E, in the circuitry of FIG. 2. By arrangement of the phonic wheel 10, the output of the filter 28 can be made linear relative to the axial position of the shaft 12. The block diagram of FIG. 2 shows that the circuits 32 and 34, associated with overspeed and episoidal transient detection respectively, are both configured to use the outputs of both probes 18, 20, and thus provide a system involving a degree of redundancy.

FIG. 4 shows the configurations of the probe/phonic wheel whenusing an amplitude comparison method to detect axial shaft position. FIG. 4A shows the two probes 40,42 symmetrically positioned at each axial end of a phonic wheel 44 secured to and rotatable with a shaft 46, the wheel having a set of straight cut teeth 48: because of the symmetrical positioning, the probes produce output signals of substantially equal amplitude. FIG. 4B shows the shaft 46 and phonic wheel 44 after they have moved axially to the right (as viewed in the FIG.) with respect to the probes 40, 42, thus increasing the amplitude of the probe 40 (rightmost probe) output signal and decreasing the amplitude of the probe 42 output signal. FIG. 4C merely shows an alternative way of arranging the initial, symmetrical position of the probes with respect to two axially spaced phonic wheels 50,52 (or a single one with a central circumferential channel), again with straight cut teeth.

The detection circuitry for use with the probe 1 phonic wheel configurations of FIG. 4 is shown in FIG. 5, and comprises respective mean value sensing circuits 54,56 for converting each probe signal to a mean value of its sinusoidal input: this value is controlled by the axial and vertical position of the respective probe 40,42 relative to the phonic wheel 44 because of the amount of magnetic coupling between probe and wheel as the shaft 46 moves relative to the probe. Thus by comparing the respective means amplitudes of the signals from the probes 40,42 in a comparison circuit 58, it is possible to produce a measure of axial displacement.

A consideration to be taken into account is that episoidal motion of the shaft 46 affects the amplitude of the probe waveform and may therefore affect axial displacement measurement by this method, as the method relies on measuring and comparing waveform amplitudes from the two probes 40,42.

With this system, as with the system of FIG. 2, overspeed trip and episoidal limit circuits are included in the system, at 60 and 62 respectively: the circuit 60 corresponds to the circuits 22,24,32 and 34 of FIG. 2, while the circuit 62 corresponds to the circuit 36 of FIG. 2.

As previously, both the episoidal limit and the overspeed trip circuits are configured to use both probes to provide inputs, producing a system having a degree of redundancy.

As can be seen from FIGS. 1 and 4, rod-type magnetic probes 18,20 or 40,42 extending radially of the shaft 12 or 46 are used. As will become apparent, each of the probes 18,20,40,42 involves a coil in which the probe output is induced. However, due to the closeness of the two probe coils to one another, careful consideration has to be given to the magnetic circuit to minimise any cross coupling effects between the two probes. Several structures are possible, and some of these are shown in FIGS. 6 to 8: each structure involves two coils 70,72, one associated with each probe, two permanent magnets 74,76, one associated with each probe, and various magnetic circuit members indicated at 78,80,82,84,86. Rare earth magnets can be used if required by the power considerations, and the probes should then have an operating temperature range of −55C. to approximately +180C. In each case, the axes of the coils 70 and 72 extend radially of the shaft and phonic wheel.

After signal conditioning, which involves converting the incoming probe signals to a square wave equivalent, there are two methods of overspeed detection that can be employed. The first method is described in relation to FIG. 2, and uses a precision frequency-to-voltage converter whose DC output is compared with a preset limit. Circuitry for implementing the second method is shown in FIG. 9, and comprises a counter 90 that compares a probe frequency count with a reference frequency count accumulated in a counter 92 to determine an overspeed threshold: basically, if counter 90 overflows before counter 92 produces a reset pulse, an overspeed condition exists and is recorded in latch 94. This second method relies on the accuracy and stability of the reference frequency, produced by a source 96, to produce a low tolerance output. To maintain the low current consumption required to permit a self-powering system, a precision R-C dependent reference oscillator whose frequency, accuracy and stability depends on the R-C components selected is used as a source 96, as although a crystal oscillator meets the accuracy and stability requirements, it requires considerable current to drive. Using an R-C dependent oscillator also makes selection of different trip frequencies easier to perform by simply altering the reference frequency. This second method provides for a more accurate and stable overfrequency trip operation.

No further signal conditioning need take place if a phase-dependent axial measurement system of FIGS. 1 and 2 is employed, as this already has sufficient signal conditioning on the probe inputs to the axial measuring circuit to satisfy the needs of the overspeed protection circuit. If, however, a voltage comparison method is used, as in the system of FIGS. 4 and 5, extra signal conditioning will be needed before the probe waveform can be presented to the overspeed circuit.

As already mentioned, episoidal transients are detected in both systems described hereinbefore, in order to facilitate the detection of turbine blade loss etc. that is the usual cause of an unbalanced and therefore episoidally rotating shaft. Speed probe detection of a phonic wheel mounted on the shaft behaving in this manner will produce a sinusoidal output of tooth frequency with a modulation at or below shaft frequency superimposed on the waveform due to the distance variance between probe and wheel caused by episoidal motion of the shaft. Detection of this phenomenon requires a method of separating the two frequencies (which can be regarded as a modulation wave and carrier wave). The frequency of the modulation will be at or below the shaft speed as it is possible that the episoidal rotation will occur at a lower speed than the shaft rotational speed. This means all frequencies at or below shaft frequency need to be considered. Accordingly, the episoidal transient detection circuitry of FIG. 10 uses a low pass filter 100 with a sharp cut-off at maximum shaft frequency to remove tooth frequency oscillations and isolate all frequencies that may contain modulation due to episoidal motion. This isolated signal is passed through a precision absolute value circuit 102 and then through a filter 104, to give a DC output proportional to the episoidal oscillations.

With the systems described above, two ways of providing the necessary power for operating the systems are possible. These are using the main aircraft supply, or being self-powered. The systems so far described are all capable of being powered by the probe that they are using to monitor the phonic wheel, and the systems may be supplied from either or both the probe head outputs, creating a power supply source with a degree of redundancy: such a system is shown in FIG. 11, where signals from both probes 18,20 are applied via a rectifier circuit 110 to a power supply regulator 112, which powers the remainder of the system.

There are several realisable advantages of using such a self-powered system.

1. The system is self-contained and completely separate from any other engine system.

2. It is easier to conform to some electromagnetic interference (EMI) and lightning strike specifications.

3. The system becomes engine start-up dependent, ie it will start-up only when the engine reaches sufficient speed to provide enough probe voltage to supply the system. This can be made a pre-set point by keeping the internal rail in the system clamped down until a certain probe voltage has been obtained.

For a self-powered system for axial displacement measurement, overspeed trip and episoidal limit detection, only a single rail need be supplied (typically 5V), which makes construction of the power supply for the system fairly simple and of relatively few components. Lightning strike and other EMI specifications can be conformed to more easily than with an aircraft supplied system, as the unit has an effective floating power source. Outputs from the system can be optically coupled FET switch or analogue outputs, to preserve the floating capabilities of the power supply.

The systems described are suitable for gas turbine engines such as the Rolls-Royce/Turbomeca RTM322, the preferred system being that of phase measurement to determine axial positon. This preferred system has the advantage of accuracy and relative simplicity without the added complication of having to separate any episoidal modulating waveform to obtain axial data as the axial processing uses a square wave technique. It is possible that further processing of the data provided by such a system could be used for engine health monitoring and may lead to early detection of on-coming shaft and blade failures. The system also includes the function of overspeed, which has often previously been designated to the main control unit; in this way, better failsafe operation is produced, by using a separate system with a self-contained power source.

Many modifications can be made to the described embodiments of the invention. For example, both halves of the phonic wheel of FIG. 1 can be diagonal cut, in opposite directions, if desired. Also, it is possible to use suitable probes other than inductive probes to sense the passage of the teeth of the phonic wheels, e.g. electro-optical probes, capacitative probes or the like.

We claim:

1. A shaft monitoring system comprising:
   first and second toothed members coaxially secured to the shaft for rotation therewith, said members being axially adjacent and each having at least one tooth which extends generally axially of the shaft at an angle to the axis of the shaft different from that of the at least one tooth of the other member;
   first and second sensor mounted adjacent said first and second toothed members respectively so as to produce respective alternating signals representative of the passage of the respective at least one tooth therepast during rotation of the shaft, the disposition of the sensors with respect to their respective toothed members being such that axial movement of the shaft causes a change in phase between said alternating signals; and
   a circuit for producing an output signal representative of the phase difference between said alternating signals, and therefore representative of the axial position of the shaft.

2. A shaft monitoring system as claimed in claim 1, wherein both toothed members have a plurality of equi-angularly spaced apart teeth, with the same number of teeth on both members.

3. A shaft monitoring system as claimed in claim 2, wherein the teeth on one of the toothed members extend parallel to the axis of the shaft, while those on the other toothed member are inclined to the axis of the shaft.

4. A shaft monitoring system as claimed in claim 1, wherein the toothed members are integral with or abut each other.

5. A shaft monitoring system as claimed in claim 1, wherein said at least one tooth is made from or includes a magnetic material, and each sensor is an inductive sensor.

6. A shaft monitoring system as claimed in claim 5, further comprising a power supply circuit for deriving a DC power supply for said system from at least one of said alternating signals.

7. A shaft monitoring system as claimed in claim 1, further comprising an overspeed circuit for deriving from at least one of said alternating signals a signal indicating that the rotational speed of the shaft has exceeded a predetermined speed.

8. A shaft monitoring system as claimed in claim 1, further comprising a circuit for deriving from at least one of said alternating signals an output signal indicative of epicyclic movement of said shaft.

* * * * *